June 18, 1957 G. I. HATFIELD 2,796,574

RE-ENTRANT SWITCHING SERVO SYSTEM

Filed June 4, 1953 4 Sheets-Sheet 1

GEORGE I. HATFIELD
*INVENTOR.*

*BY*

Killman and Kerst
*ATTORNEYS*

GEORGE I. HATFIELD
*INVENTOR.*

*BY*

Killman and Kerst
ATTORNEYS

June 18, 1957 G. I. HATFIELD 2,796,574

RE-ENTRANT SWITCHING SERVO SYSTEM

Filed June 4, 1953 4 Sheets-Sheet 3

GEORGE I. HATFIELD
*INVENTOR.*

*BY*

Killman and Kerst
ATTORNEYS

RE-ENTRANT SWITCHING SERVO SYSTEM

Filed June 4, 1953 4 Sheets-Sheet 4

| | 2 | 4 | 6 | 8 | 10 | 12 | 14 | 16 | 18 | 20 | 22 | 24 | 26 | 28 |
|---|---|---|---|---|---|---|---|---|---|---|---|---|---|---|
| A | X | X | X | | | X | | | X | X | | | | X |
| B | X | X | X | X | | | X | | | X | X | | | |
| C | | X | X | X | X | | | X | | | X | X | | |
| D | | | X | X | X | X | | | X | | | X | X | |
| E | | | | X | X | X | X | | | X | | | X | X |

| | 1 | 3 | 5 | 7 | 9 | 11 | 13 | 15 | 17 | 19 | 21 | 23 | 25 | 27 |
|---|---|---|---|---|---|---|---|---|---|---|---|---|---|---|
| A | X | | X | X | | X | X | X | | X | | | | |
| B | | X | | X | X | | X | X | X | | X | | | |
| C | | | X | | X | X | | X | X | X | | X | | |
| D | | | | X | | X | X | | X | X | X | | X | |
| E | | | | | X | | X | X | | X | X | X | | X |

FIG. 3

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| A | X | X | | X | X | X | X | | | | X | X | X | | X | | | X | X | X | | | | | | | | X |
| B | | X | X | X | | X | X | X | X | | | | X | X | X | | X | | | X | X | X | | | | | | |
| C | | | | X | X | X | | X | X | X | X | | | | X | X | X | | X | | | X | X | X | | | | |
| D | | | | | | X | X | X | | X | X | X | X | | | | X | X | X | | X | | | X | X | X | | |
| E | | | | | | | | X | X | X | | X | X | X | X | | | | X | X | X | | X | | | X | X | X |

FIG. 4

| | | | | |
|---|---|---|---|---|
| A | X | X | X | |
| B | | X | X | X |
| C | X | | X | X |
| D | X | X | | X |

| | | | | |
|---|---|---|---|---|
| A | X | X | | |
| B | | X | X | |
| C | | | X | X |
| D | X | | | X |

| | | | | |
|---|---|---|---|---|
| A | X | | | |
| B | | X | | |
| C | | | X | |
| D | | | | X |

FIG. 8

| | 1 | 2 | 3 | 4 | 5 | 6 | 7 | 8 |
|---|---|---|---|---|---|---|---|---|
| A | X | X | X | | | | | |
| B | | | X | X | X | | | |
| C | | | | | X | X | X | |
| D | X | | | | | | X | X |

FIG. 9

GEORGE I. HATFIELD
*INVENTOR.*

*BY*

Killman and Kerst
ATTORNEYS 2,796,574

RE-ENTRANT SWITCHING SERVO SYSTEM

George I. Hatfield, Baltimore, Md., assignor to Bendix Aviation Corporation, Towson, Md., a corporation of Delaware Application June 4, 1953, Serial No. 359,552

19 Claims. (Cl. 318—467)

This invention relates to systems for establishing the angular positions of remotely located apparatus, such as a shaft, in accordance with the angular position of nearby similar apparatus. It is specifically directed to electrical switching arrangements for the above purpose in which lack of angular correspondence between two switching elements, one remotely and one locally positioned, completes an energizing circuit for the rotation of the remotely positioned element, which circuit is broken upon the attainment of angular correspondence.

Various arrangements have, in the past, been suggested for this purpose. As an example, U. S. Patent No. 2,476,673, R. W. May et al. for "Shaft Positioning Control System," issued July 19, 1949, discloses a system employing in the controlling station a pair of conductive switch commutator rings rotatable as a unit and insulated from each other. The peripheries of these rings are serrated to form commutating contact portions, with the contacting arrangement of one ring being the inverse of that of the other. This is, each serrated portion of one ring is matched with an unserrated portion of the other. The controlled station is provided with an identical pair of rings. The rings in each station are part of an arrangement well known in the art as a wafer-type switch, in which the rings are mounted as a unit on an insulating rotor coacting with a stator carrying uniformly spaced brushes. In the example shown in the patent the stations are connected by four conductors plus a ground return. These wires terminate at each station in uniformly spaced brushes, each of which contacts the peripheries of both rings. At the controlling station a ground connection terminates in a brush making continuous contact with one of the rings in its unserrated portion. At the controlled station a conductor from a source of energy, such as a battery, terminates in a brush making continuous contact with the unserrated portion of the opposite ring. The switch in the control station will be called the "selector" and the one in the controlled station the "follower."

The rotary switching arrangement described is of the open seeking variety in which a setting of the rotor in the controlling station differing from that in the controlled station completes a connection from the energy source through the relay coil and one or more of the conductors to ground. The arrangement is also of the re-entrant type in which the conductive path between stations will, for some relative settings of the selector and follower rotors, extend from the selector rotor to the follower rotor, back to the selector rotor and finally back to the follower rotor before continuing on through the relay coil to the energy source.

The re-entrant feature is made necessary by the use of permuted combinations of contacts on the two rotors and the latter arrangement is dictated by the desire to reduce the number of conductors between stations to a minimum.

If no regard were had for the number of inter-station conductors the simplest arrangement of an open seeking rotary switching system would utilize a separate conductor for each indexed position of the selector and a single commutator ring at each station. The ring at the controlling station would have a single tooth or peripheral contact portion adapted to make contact with one brush at a time. The ring at the controlled station would have a contacting periphery with but a single serration wide enough to interrupt contact with but a single conductor at a time.

But, since reduction of the number of conductors is an important consideration, it is desirable to secure the reduction which can be obtained by departing from the grounding sequence followed in the example just given, in which the conductors are grounded one at a time. By grounding various combinations of conductors for the different indexing positions of the switch, fewer wires will suffice.

In a switch having $n$ inter-station conductors plus a ground return the summation of the usable unique grounding combinations will be $2^n-2$. It would be $2^n$ except that if all wires were grounded the follower would of necessity find a corresponding position in which all the conductors were interrupted. It would then be impossible to reactivate the circuit by indexing the selector. Likewise, if all the conductors were ungrounded then all positions of the follower would provide an open circuit, and the latter would not follow to a position corresponding to this selector position.

The necessity for the re-entrant feature flows from the ambiguity which would otherwise result from the connection of more than one conductor at a time to ground in the selector. For example, if two conductors are so grounded, then the follower provides an open circuit only by interrupting both of them. There may, however, be other positions of the selector rotor which will ground only one of the conductors and the follower will continue to provide an open circuit for these single conductors by staying where it is. To avoid this difficulty the follower must provide to the selector some indication of its position and this information then be used to influence the position of the follower. This function is provided by the re-entering signal, which, for certain relative positions of the selector and follower originates in the selector, travels to the follower, re-enters the selector and finally returns to the follower. The re-entrant system is in reality a series-parallel arrangement of inter-station conductors in which each conductor is always subjected to one of two conditions, being either grounded or connected to all other ungrounded conductors. It is this second or "floating" condition which gives rise to the re-entering signal and renders the response of the follower unique for each grounding combination set up by the selector.

The patent to May et al. illustrates, in Figs. 3 to 6 of the drawing, a re-entrant switching system employing four inter-station conductors plus a ground return and switch wafers provided with fourteen uniformly spaced attaching positions for the brushes which terminate the inter-station conductors. The four brushes are attached at four consecutive ones of these positions and the rotors are indexed one position at a time. The grounding brush at the selector and the brush connecting through the relay coil to the energy source at the follower are attached at otherwise unused positions on the wafers. The patent shows, in column five of the specification, a table of the grounding arrangements for each switching position. It will be seen that each grounding arrangement is unique.

The patent thus discloses a switching system using four inter-station conductors and two fourteen-position wafers and attaining with this equipment a maximum of fourteen switching positions.

While the May patent discloses switching arrangements which are adequate for certain purposes and requirements, the systems disclosed do possess very definite limitations as to the number of switching positions which can be attained with a given number of conductors and standard switch wafers. In many instances the complexities of modern remote control systems impose requirements which cannot be satisfactorily met by the teachings of this patent and the remainder of the prior art.

While these limitations can sometimes be overcome by the use of more inter-station conductors, this is an undesirable expedient. They can sometimes be alleviated by having special switch wafers made up with a non-standard number of contact positions or a larger number of contact positions than are normally provided. These expedients are also undesirable, however. The art has, for example, standardized wafers having certain definite numbers of contact positions. The fourteen position wafer is standard as are those having ten, twelve, eighteen and twenty equally spaced positions. For combinations of switch positions outside of these standard numbers or simple fractions of them, it is necessary to either utilize wafers with more switch positions than it is desired to use or to have special wafers made. The latter expedient requires special dies and is an expensive and time consuming matter. The first expedient is also unduly expensive since die cost increases with die complexity, and is often undesirable because the dimensions of the wafer are increased.

It is an object of this invention to provide a switching system having increased flexibility in the use of standard elements over those previously known.

It is a further object of the invention to provide a switching system which provides a greater number of switching positions for a given number of stator contact positions and number of inter-station conductors than has hitherto been attainable.

It is another object of the invention to provide a switching system in which simpler rotor design than was formerly necessary may be employed.

It is still another object of the invention to provide a switching system in which greater overall simplicity may be attained in switch construction than has hitherto been possible for a given number of switching operations.

The above and other objects and advantages of the invention may be attained in a switching system in which the commutator rings of the switches are constructed by selecting two or more simple re-entrant grounding sequences, then interleaving or alternating them to form the complete grounding sequence and constructing the rings to conform to the complete sequence. The number of grounding combinations in each of the selected sequences is equal to the number of available contact positions in the standard switch stator which it is desired to use or to a factor of that number. Each grounding arrangement in the complete grounding sequence must be unique except in situations where ambiguity is desired in the system.

The term "grounding sequence" is meant to refer to the order in which the various unique permutations of inter-station conductors are grounded as the selector switch is indexed through its sequence of detented positions. The grounding sequence is determined by the arrangement of switch tabs on the various commutator rings of the switches.

In the drawing:

Fig. 3 shows a pair of diagrams of grounding sequences;

Fig. 4 is a diagram of the grounding sequence resulting from interleaving the sequences of Fig. 3;

Fig. 8 shows three diagrams of grounding sequences usable in the system of Fig. 7;

Fig. 9 shows a diagram of the grounding sequence resulting from the interleaving of two of the sequences of Fig. 8.

Figure 1:
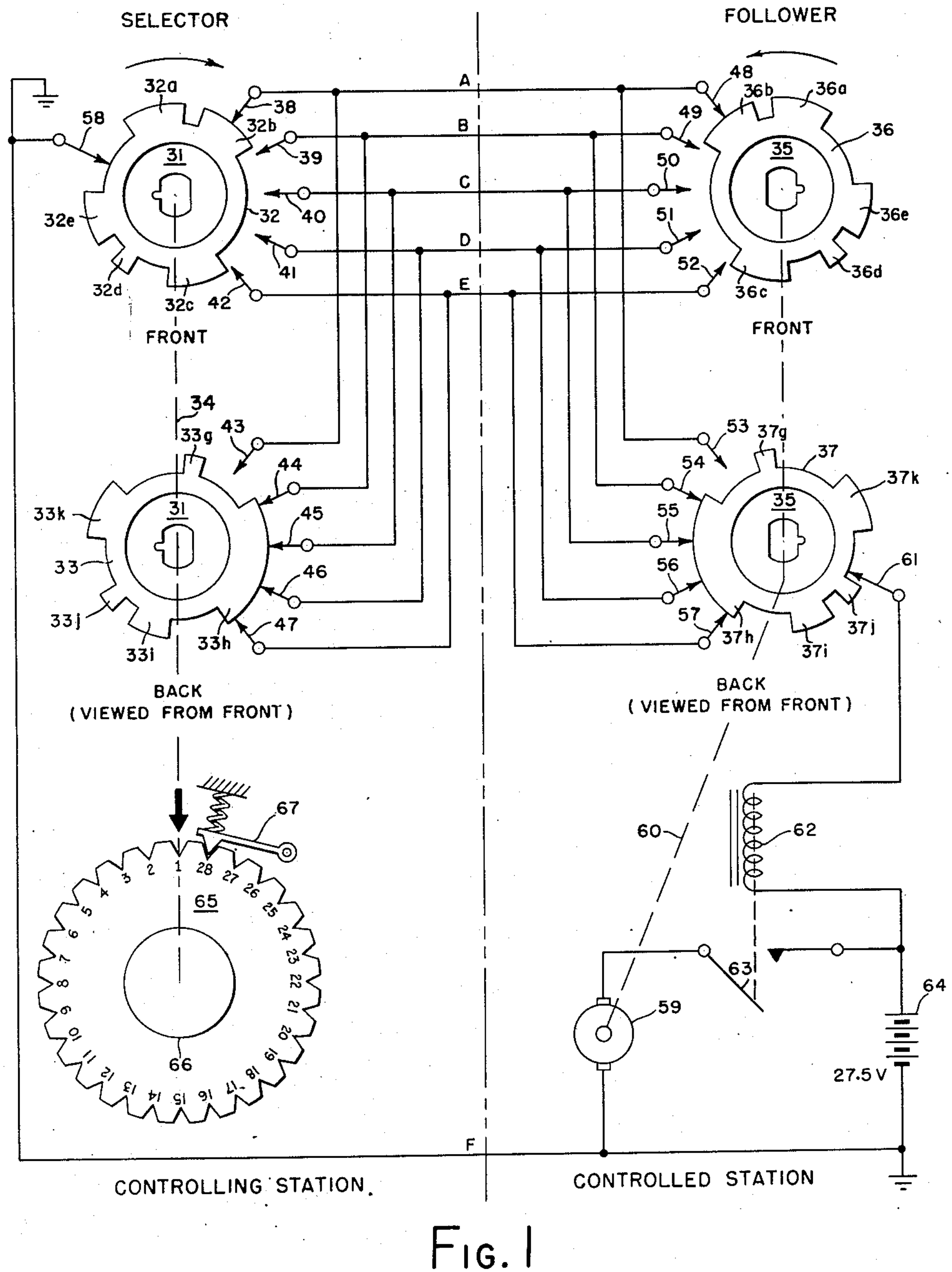
Fig. 1 is a schematic circuit diagram of a switching system embodying the invention.

Referring now more particularly to the drawing, there is shown in Fig. 1 a schematic diagram of a switching system utilizing switch stators having fourteen contact positions but arranged to have twenty-eight switching or indexing positions.

In this figure the portion to the left of the central dashed line represents the controlling station while that to the right of the line represents the controlled station. In the controlling station is the selector switch comprising a rotor composed of an insulating wafer 31 and two commutator rings 32 and 33. The rings 32 and 33 are secured to opposite faces of the wafer 31 but are shown in this figure as mounted on two separate wafers 31 connected by a shaft indicated by dashed line 34. This showing is for purposes of clarity.

In the controlled station is the follower switch of similar construction, comprising an insulating rotor wafer 35 to the opposite faces of which are secured commutating rings 36 and 37.

Five inter-station conductors A, B, C, D and E are provided.

These conductors terminate at the selector switch in brushes 38, 39, 40, 41 and 42, respectively, making contact with teeth protruding from the ring 32 and in brushes 43, 44, 45, 46 and 47, respectively, making contact with teeth on the ring 44. At the follower switch the inter-station conductors terminate in brushes 48, 49, 50, 51 and 52, respectively, making contact with the teeth of ring 36 and in brushes 53, 54, 55, 56 and 57, respectively, making contact with the teeth of ring 37.

In the controlling station a grounded brush 58 makes continuous contact with the ring 32 and is connected by ground return F to one terminal of the energy source 64 in the controlled station. The motor 59 drives the follower switch through a shaft 60. A brush 61 makes continuous contact with the ring 37 in the controlled station and is connected through the energizing coil 62 of a relay 63 to one terminal of an energy source 64 shown as a battery. The remaining terminal of the source 64 is connected to the ground return F. The remaining terminal of the motor is connected to the ungrounded terminal of source 64 by way of relay 63.

Figure 2:
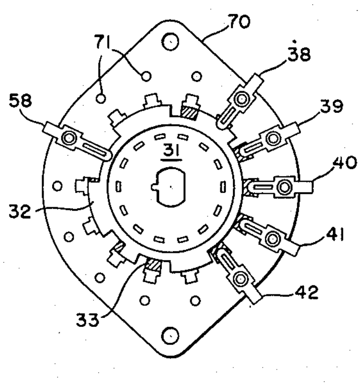
Fig. 2 is an elevational view of the selector switch of the system of Fig. 1.

Fig. 2 is a front view of the selector switch showing the ring 32 mounted on the insulating rotor 31. The ring 33 is mounted on the opposite face of the rotor 31. The rotor 31 and the two rings form a rotating element journalled in a central opening formed in a stator wafer 70.

The wafer 70 is a standard fourteen position stator. That is, it is provided with fourteen small holes 71 which act as attaching points for the clips which act as wiping brushes, such as 38, 39, etc.

The selector switch is, however, provided with twenty-eight detented switching positions. This may be accomplished, as shown in Fig. 1 by a manually operated detenting mechanism comprising a dial 65 fixedly mounted on the shaft 34. At the center of the dial is a knob 66 by which it can be rotated. The periphery of the dial is provided with twenty-eight indentations marked with numerals indicating the twenty-eight switching positions. A spring biased detenting arm 67 retains the switch in any selected switching position by coacting with the indentations of the dial. It is thus apparent that the brushes 38, 39, etc., are spaced apart by two switching positions of the rotor of the selector. The same is, of course, true of the brushes on the follower switch.

In the operation of the switching system of Fig. 1 we find that as shown the system is at rest with the motor 59 de-energized and the rotors of the selector and follower switches in corresponding positions. The portion of the circuit between brushes 58 and 61 is incomplete. If, however, the dial 65 is indexed to position 2, both brushes 38 and 39 will be in contact with tooth 32*b* of ring 32 and the relay energizing circuit will be completed from brush 58, ring 32, tooth 32*b*, conductor B, brush 54 to brush 61 through tooth 37*h* and ring 37. When the motor 59 is energized the follower rotor will be rotated one position in a counterclockwise direction. This will disconnect brush 54 from tooth 37*h* and again interrupt the motor circuit.

The curved arrows above the selector and follower indicate that a clockwise rotation of the knob 66 and the selector will result in the follower coming to rest in a position which is counterclockwise with respect to its initial position.

It will be noted that rings 32 and 36 and likewise rings 33 and 37 are identical, in the sense that in each case both rings can be stamped out by the same die. In the arrangement as illustrated we are looking at the opposite sides of rings 32 and 36 and the opposite sides of rings 33 and 37. We could reverse one ring of each pair and obtain the same order of operation by reversing the sequence of connections between selector and follower.

While the switching operation described above does not require a reentrant path to complete the circuit, there are a number of relative positions of the selector and follower which will, however, require such a path. For example, let it be assumed that the system of Fig. 1 has been at rest with the dial 65 in position 2, instead of in position 1 as illustrated. In that position the brushes 48 and 49 would be in contact with tooth 36*b* and both brushes 53 and 54 would be out of contact with any of the teeth of ring 37. Now let it be assumed that the dial 65, which had been in position 2 is detented to position 1, which is the position illustrated. Now the circuit from brush 58 will be by way of ring 32, tooth 32*b*, brush 38, conductor A, brush 48, tooth 36*b*, brush 49, conductor B, brush 44, tooth 33*h*, brushes 45, 46 and 47, conductors C, D and E, brushes 55, 56 and 57, tooth 37*h*, ring 37 and brush 61. This is the reentrant type of path.

It will be found that any detented position of the selector relative to the follower, other than exact correspondence, will complete the motor energizing circuit. The path of current flow for each relative position will be unique.

It can be seen that a switching system has been provided in which the number of available switching positions which may be obtained by the use of a standard wafer switch has been greatly increased. This has been accomplished without the addition of new circuit components or any increase in circuit complexity.

In devising an interleaved system such as disclosed in Fig. 1 it is first necessary to determine the number of switching positions desired, then the number of inter-station conductors required, then the number of stator contact points to be used and finally the angular spacing between brushes.

In making these determinations certain limitations must be kept in mind. In general, a re-entrant switching system employing a plurality of interleaved grounding sequences may be constructed in cases where the number of desired switching positions is an integral multiple of the number of available contact positions on the stator or in which the number of available contact positions and the number of desired switching positions have a common factor. The number of inter-station conductors exclusive of the ground return must be at least three since it takes three such conductors to establish a re-entrant signal path.

The factor must be equal to or greater than the number of inter-station conductors. The stator must have at least as many contact positions as the number of inter-station conductors including the ground return since there must be an attaching point for each.

A practical limitation to the number of switching positions which may be had with a stator of given size is set by the dimensions of the brushes and the angular positional uncertainty of the relatively rotating and the fixed contacting portions of the switch.

In establishing the system of Figure 1 it was decided to use a fourteen position stator since that is a standard element and fourteen is a simple fraction of twenty-eight. A seven position stator could have been used by employing four interleaved grounding sequences, but such a stator is not a standard item.

In providing twenty-eight switching positions five inter-station conductors exclusive of the ground return are required, since $2^4-2=14$, which is insufficient and $2^5-2=30$, which provides just two more possible grounding combinations than are required. This determination fixes the number of stator points to be used at five for the signal wires plus one for the ground return through the battery circuit.

The spacing of the used stator points must be by an angle which is harmonically related to $$\frac{360°}{P}$$

when P is the number of switching positions. In this case it was decided to use a spacing of $$\frac{360°}{14}$$

although one of $$\frac{360°}{7}$$

could have been used.

In using two interleaved grounding sequences of fourteen combinations each, the combinations of one sequence will be supplied to the odd numbered switching positions while those of the remaining sequence will apply to the even numbered positions.

The manner of designing the commutator rings of the rotors for the system illustrated in Fig. 1 will now be explained. Since each sequence will consist of fourteen unique combinations it is necessary to design two sets of interleavable ring configurations, each of which will span fourteen switch positions in the aggregate. This may be done by first listing all the even numbered combinations of addends of fourteen. By the term "addends" is meant the numbers which when added together equal the desired sum. Each combination must have an even number of addends because of the endless nature of the commutator. Next list all the cyclic permutations of these addends. Now, considering the numerical value of each addend to represent the corresponding number of commutator switch tabs, each dimensioned for one switching position, prepare a grounding diagram for each permutation. Two such diagrams are shown in Fig. 3. The letters along the left hand edge of each diagram refer to the respective inter-station conductors. Each horizontal row of spaces thus represents the grounding sequence for one of these conductors. Each horizontal space indicates one switch position. An X in the space indicates a ground while the absence of an X indicates an open circuit for that conductor. These sequences should be considered as endless. The left hand diagram may be considered, therefore, as representing a grounding sequence for a commutator arrangement corresponding to the permutation 4, 2, 1, 2, 2, 3 while the right hand diagram corresponds to the permutation 1, 1, 2, 1, 3, 1, 1, 4.

Each diagram should now be checked to see whether or not any two switching positions present identical grounding arrangements. If so, the permutation is not usable. When a usable sequence is fouund its complement should be listed and it should also be listed in its reversed order since these forms will also prove to be usable. Since two of these sequences are to be interleaved the usable sequences must be checked in pairs for combinations in which the same grounding arrangement does not appear twice. In constructing the switching system illustrated in Fig. 1 a total of fifty-seven usable sequences was found and of these four pairs were found which contained no duplicate grounding arrangements. The pair of these sequences which was used is the pair illustrated in Fig. 3.

Figure 5:
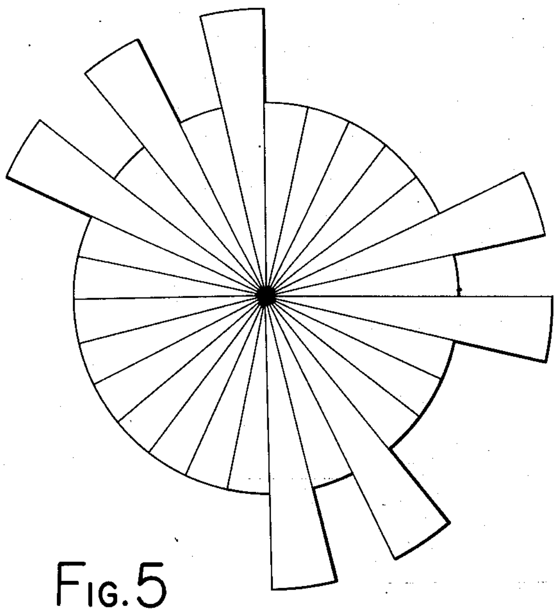
Figs. 5 and 6 are plan views of templates of commutator configurations arranged in accordance with the respective grounding sequences of Fig. 3.
Figure 6:
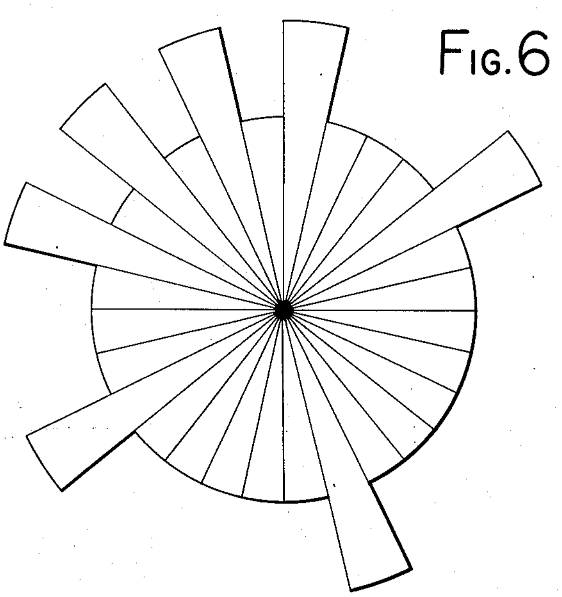

Templates may now be made as illustrated in Figs. 5 and 6, which show templates of the grounding sequences of Fig. 3. Each template is divided into as many segments as there are switching positions, and for a complete sequence of positions the grounded positions are formed into tabs, while no tabs are provided for the ungrounded positions. Adjacent positions in the diagram are spaced apart by one position on the template since the sequences are intended to be interleaved. The template of Fig. 5 corresponds to the left hand diagram of Fig. 3 while the template of Fig. 6 corresponds to the right hand diagram.

Having made templates for all diagrams which are interleavable, various pairs are tried together to secure the simplest arrangement of commutator cuts and the fewest single position tabs. Various relative orientations of the templates of each pair are also tried. When the simplest combination is found a pair of rings is cut to conform to it. A second pair of rings having tabs where there are cuts in the first pair, and cuts where there are tabs, is then formed. Two rings, one of each type, make up the selector and the other two make up the follower.

In the system of Fig. 1 the templates of Figs. 5 and 6 were superimposed in the orientation shown to make the commutator arrangement of rings 33 and 37. In some situations it will be found that all four rings may be identical, the two rings in each switch being reversed with respect to each other. This situation is particularly advantageous since it reduces the number and hence the cost of dies. On such a switch the direction of rotation of the follower with respect to he selector may easily be reversed by reversing the sequence of connections from selector to follower.

The practice of interleaving in accordance with the invention introduces a great deal of flexibility into the design of switching systems using standard switch wafers. For example, an eight position switch may be made on any multiple of a four position stator. It could be made on a four position stator if there were a contact position available for the ground connection. A thirty position switch (or fifteen, twenty or twenty-five position switch) may be made on a wafer having ten, fifteen, twenty or twenty-five contact positions. Of these the ten and twenty position stators are standard. A thirty position switch could even be made on a five position stator if there were a place for the ground contact. A thirty-six position switch (with six re-entrant inter-station conductors) could be made on a nine, twelve, eighteen, twenty-four, twenty-seven or thirty position stator. Of these the twelve and eighteen position stators are standard.

Figure 7:
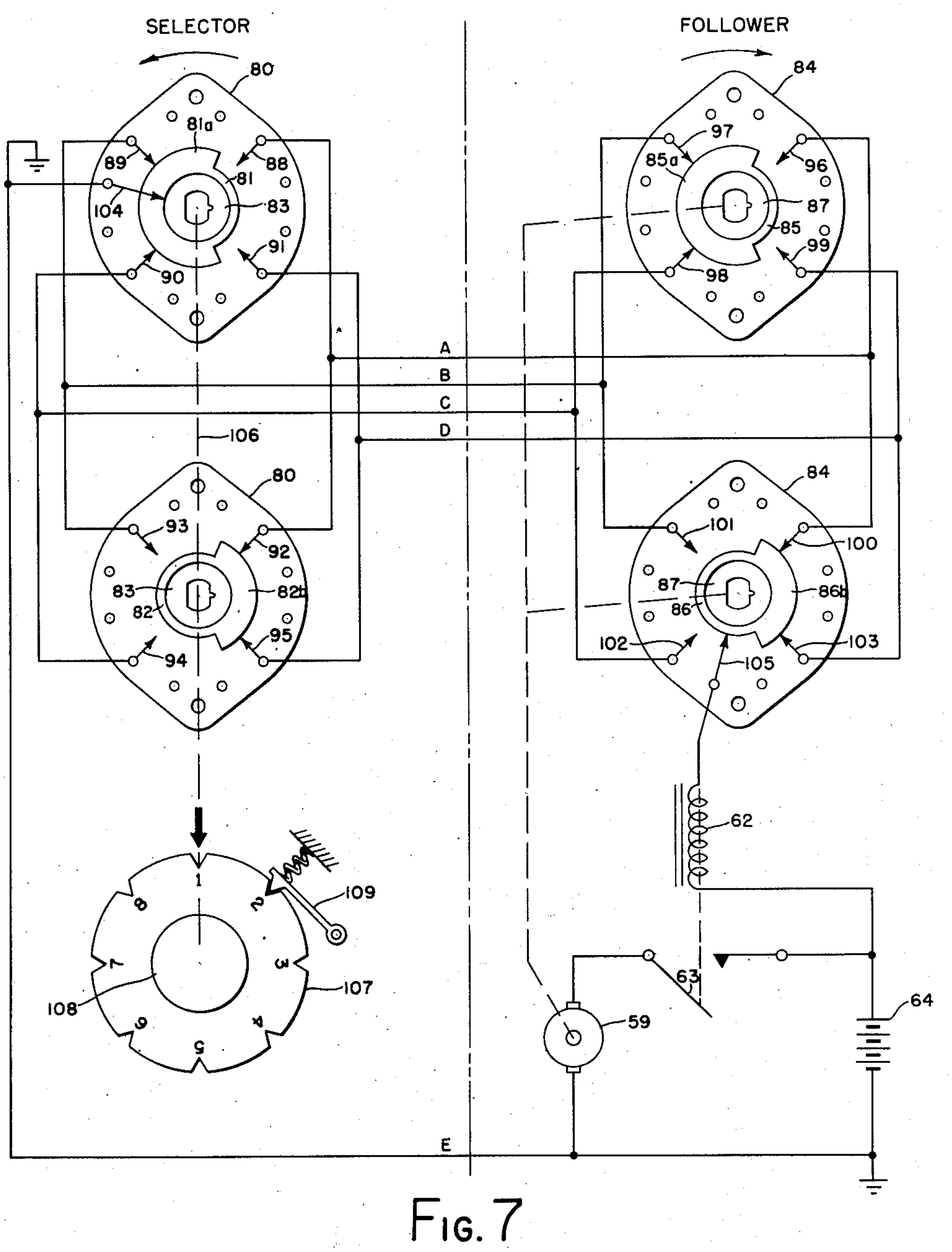
Fig. 7 is a schematic circuit diagram of a switching system embodying the invention and providing eight switching positions by the use of twelve position stators.

As an example of these possibilities there is shown in Fig. 7 a switching system affording eight switching positions on a standard twelve position wafer. In this figure the system illustrated uses four inter-station conductors A, B, C and D plus the ground return E. In the controlling station the selector switch comprises a twelve position stator 80, with which coact two commutator rings 81 and 82 mounted on a rotor wafer 83.

In the controlled station the follower switch comprises a twelve position stator 84, with which coact two commutator rings 85 and 86 mounted on a rotor wafer 87.

The brushes wiping the teeth of each commutator rings are spaced by 90° intervals, the conductors A, B, C and D terminating in brushes 88, 89, 90 and 91, respectively, wiping the teeth of ring 81; brushes 92, 93, 94 and 95 wiping the teeth of ring 82; brushes 96, 97, 98 and 99 wiping the teeth of ring 85; and brushes 100, 101, 102 and 103 wiping the teeth of ring 86.

The remainder of the motor energizing circuit is the same as in Fig. 1, the ground return E terminating in a brush 104, wiping ring 81 and the free terminal of the solenoid 62 being connected to a brush 105 wiping ring 86.

The rotor 83 is driven by a shaft 106, on which is mounted for rotation therewith a detented dial 107. A central knob 108 is provided for manual operation of the shaft. The dial is detented in eight positions separated by 45° intervals by a spring biased detent arm 109.

The shapes of the commutator rings of the two switches are determined in accordance with the invention by the same series of steps utilized in connection with the system of Figure 1. It is apparent that two interleaved four position, four wire sequences may be used. To determine these the even element combinations of four are listed. These are; three and one, two and two, one and three, and four ones. The latter is unusable by inspection because the repetition of unitary addends will produce a plurality of identical grounding combinations. Grounding diagrams are constructed for the other three combinations as shown in Fig. 8. It is apparent that there are no duplicate grounding combinations in this array. Since only two of these sequences are needed for eight switching positions, any two may be selected for interleaving. The center and right hand sequences were selected in this case.

Due to the simplicity of the system, templates need not be made, the interleaving being accomplished by inspection. Fig. 9 shows the interleaved arrangement that was used, the center diagram of Fig. 8 supplying the odd positions while the right hand diagram supplies the even positions. The resulting diagram of Fig. 9 calls for a commutator ring having a tooth three-eighths of the circumference in angular extent, the remainder of the ring having a single peripheral recess or cut out portion five-eighths of the circumference in angular extent. This is the pattern of rings 82 and 86 of the system of Fig. 7, the remaining rings being the electrical reverse of this pattern.

The system of Fig. 7 is shown in its quiescent condition with the rotors of the selector and follower in corresponding positions. The circuit from brush 104 to brush 105 is not complete through any of the inter-station conductors.

If now, however, the dial 107 is turned one position in a clockwise sense so that the numeral 8 comes under the arrow, the brush 88 will come into wiping contact with the tooth 81*a* of ring 81, and the brush 92 will lose contact with the tooth 82*b* of ring 82. The contact relationships of all other brushes will remain unchanged.

A circuit will now be completed from brush 104 to brush 105, by way of ring 81, tooth 81*a*, brush 88, inter-station conductor A, brush 100, tooth 86*b*, and ring 86. This path is not reentrant. For certain relationships of selector and follower a reentrant path would be provided, however.

As an example, suppose that the system had been at rest with dial 107 in position 8 instead of its illustrated position 1 and the dial 107 had then been turned to its illustrated position.

In this situation, brushes 96, 97 and 98 would be in contact with tooth 85*a* of ring 85 and only brush 103 would be in contact with tooth 86*b* of ring 86. The circuit from brush 104 to brush 105 would be by way of brushes 89 and 90, inter-station conductors B and C, brushes 98 and 97, tooth 85*a*, brush 96, inter-station conductor A, brush 92, tooth 82*b*, brush 95, inter-station conductor D, brush 103, tooth 86*b*, and ring 86.

What is claimed is:

1. A switching system comprising a controlling station and a controlled station, a selector switch in said controlling station and a follower switch in said controlled station, said selector switch and said follower switch each comprising a non-conductive rotor having mounted thereon a pair of commutator rings, each of said rings being formed with a pattern of contacting and non-contacting portions about its periphery, the pattern of said portions on each ring being the reverse of the pattern on the other of said rings of the same switch and the pattern of said portions on each of said rings being identical with the pattern on one of the rings of the other switch, a plurality of conductors extending between said switches, each of said conductors terminating at each of said switches in a pair of contacting elements, means mounting the contacting elements of said pair in a fixed location in a position such that each element will make wiping contact with the contacting portions of a respective one of said commutator rings as said commutator ring is rotated, said positions of the contacting elements contacting with each of said commutating rings forming a group of positions with adjacent positions of said group having a uniform angular separation about the axis of rotation of said ring, means detenting said rotor of said selector switch at positions having a uniform angular spacing which is a simple fractional part of the angular separation of said adjacent positions of said contacting elements, electrically conductive means making continuous contact with one of said commutating rings of one of said switches and with the commutating ring of the other of said switches which has the pattern of contacting portions which is the reverse of the pattern of said one commutating ring, the pattern of contacting portions on each of said rings being such that a unique selection of said conductors is connected to said ring at each detented position of said rotor, driving means for said follower rotor and means energizing said driving means when said conductors and said commutating rings not in contact with said electrically conductive means provide a complete conductive path between said commutating rings which are in continuous contact with said electrically conductive means.

2. A switching system comprising a controlling station and a controlled station, a selector switch in said controlling station and a follower switch in said controlled station, said selector switch and said follower switch each comprising a non-conductive rotor having mounted thereon a pair of commutator rings, each of said rings being formed with a pattern of contacting and non-contacting portions about its periphery, the pattern of said portions on each ring being the reverse of the pattern on the other of said rings of the same switch and the pattern of said portions on each of said rings being identical with the pattern on one of the rings of the other switch, a plurality of conductors extending between said switches, each of said conductors terminating at each of said switches in a pair of contacting elements, means mounting the contacting elements of said pair in a fixed location in a position such that each element will make wiping contact with the contacting portions of a respective one of said commutator rings as said commutator ring is rotated, said positions of the contacting elements coacting with each of said commutating rings having a uniform angular separation about the axis of rotation of said ring, means detenting said rotor of said selector switch at positions having a uniform angular spacing which is a simple fractional part of the angular separation of said positions of said contacting elements, electrically conductive means making continuous contact with one of said commutating rings of one of said switches and the commutating ring of the other of said switches which has the pattern of contacting portions which is the reverse of the pattern of said one commutating ring, the pattern of contacting portions on each of said rings being such that a unique selection of said conductors is connected to said ring at each detented position of said rotor, driving means for said follower rotor and means energizing said driving means when said conductors and said commutating rings not in contact with said electrically conductive means provide a complete conductive path between said commutating rings which are in continuous contact with said electrically conductive means.

3. A switching system comprising a controlling station and controlled station, a selector switch in said controlling station and a follower switch in said controlled station, said selector switch and said follower switch each comprising a non-conductive rotor having mounted thereon a pair of commutator rings, each of said rings being formed with a pattern of contacting and non-contacting portions about its periphery, the pattern of said portions on each ring being the reverse of the pattern on the other of said rings of the same switch and the pattern of said portions on each of said rings being identical with the pattern on one of the rings of the other switch, a plurality of conductors extending between said switches, each of said conductors terminating at each of said switches in a pair of contacting elements, a stator at each of said switches coacting with the rotor thereof, means modifying the structure of said stator at a plurality of evenly spaced locations surrounding said rotor, each of said locations providing a point at which a pair of said contacting elements is attachable to said stator for contact with the contacting portions of both of the said commutating rings carried by said rotor, means attaching said pairs of contacting elements to said stator at a group of said points, said points within said group having equal angular separations about the axis of said rotor, means detenting the rotor of said selector switch at positions having an equal angular spacing which is a simple fractional part of the angular separation of said points, electrically conductive means making continuous contact with one of said commutating rings of one of said switches and the commutating ring of the other of said switches which has the pattern of contacting portions which is the reverse of the pattern of said one commutating ring, the pattern of contacting portions on each of said rings being such that a unique selection of said conductors is connected to said ring at each detented position of said rotor, driving means for said follower rotor and means energizing said driving means when said conductors and said commutating rings not in contact with said electrically conductive means provide a complete conductive path between said commutating rings which are in continous contact with said electrically conductive means.

4. Means for the selective positioning of a remotely located shaft in any desired one of a plurality of positions separated from each other by equal angles; said means comprising a selector switch, a follower switch, each of said switches comprising a rotor and a stator, the rotor of said follower switch rotating with said shaft, means for detenting said selector switch to positions corresponding to the said plurality of positions desired for said shaft, a plurality of conductors extending between said switches, the number of said conductors being less than the number of said desired shaft positions, a pair of commutator rings carried by each of said rotors, said rings of each of said pairs being insulated from each other, means terminating each of said conductors at each of said stators in contacting relation to each of the commutator rings carried thereby, the terminations in contacting relation with each of said rings each being spaced from adjacent terminations by equal angular separations with respect to the axis of the rotor of said ring, which separation is a multiple of the said angular separation of said desired shaft positions, driving means for said shaft, an energizing circuit for said driving means including electrically conductive means continuously connecting one of said commutating rings of said selector switch and one of said commutating rings of said follower switch, said energizing circuit also including said conductors and the others of said commutating rings, the patterns of the contact making portions of said commutator rings being such that for each detented position of said selector switch rotor said energizing circuit is broken only when said shaft occupies the corresponding one of said desired positions.

5. In a system for the selective positioning of a remotely located shaft in any desired one of a plurality of positions separated from each other by equal angles, said system comprising a selector switch, a follower switch, each of said switches comprising a rotor and a stator, the rotor of said follower switch rotating with said shaft, means for detenting said selector switch to positions corresponding to the said plurality of positions desired for said shaft, a plurality of conductors extending between said switches, the number of said conductors being less than the number of said desired shaft positions, a pair of commutator rings carried by each of said rotors, said rings of each pair being insulated from each other, means terminating each of said conductors at each of said stators in contacting relation to each of the commutator rings carried thereby, the terminations in contacting relation with each of said rings each being spaced from adjacent terminations by equal angular separations, driving means for said shaft, an energizing circuit for said driving means including electrically conductive means continuously connecting one of said commutating rings of said selector switch and one of said commutating rings of said follower switch, said energizing circuit also including said conductors and the others of said commutating rings; said terminations being spaced by angular separations which are equal multiples of the angular separations of the said desired positions of said shaft and being of such magnitude that the total number of available positions on said stator for terminations so spaced is a factor of the desired number of positions of said shaft, the patterns of the contact making portions of said commutator rings being such that for each detented position of said selector switch rotor said commutating rings of said selector switch provide a unique contacting arrangement to said conductors and said commutator rings of said follower switch, when in the one of said desired positions which corresponds to the detented position of said selector switch, provide an identical contacting arrangement to said conductors, but with the contacting arrangement presented by said one and said other commutating rings in each of said switches being the reverse of the contacting arrangement presented by the corresponding commutating rings of the other of said switches.

6. An automatic shaft-positioning arrangement of the type described, comprising a selector switch, a follower switch, each of said switches having similar sets of stationary and movable contacts, rotor means for each switch for operating the movable contacts thereof into engagement with the stationary contacts in a plurality of unique combinations, said rotor means of said selector switch being detented to stopping positions corresponding with the desired positions of said shaft, said rotor means of said follower switch rotating with said shaft, a set of conductors extending between said switches and terminating at each switch in said fixed contacts thereof, a ground return, said fixed contacts at each of said switches being spaced about the periphery of the rotor thereof by angular separations with respect to the axis of said rotor which are equal multiples of the angular separations of said desired positions of said shaft, and are of such magnitude that the total number of available positions so spaced in a plane about said rotor is a factor of the number of desired positions of said shaft, an electric motor for rotating said shaft and means including the fixed and movable contacts of both said switches and said conductors to maintain said shaft in rotation until the positions of the rotor of said follower switch corresponds to the setting of the rotor of said selector switch, the number of said detented positions of the rotor of said selector switch being no larger than $(2^n-2)$ where "$n$" is the number of said conductors of said set.

7. Apparatus for selectively positioning a shaft in any one of a number of positions separated by equal angular amounts comprising a switch having a rotor bearing a plurality of movable contacts, said rotor rotating with said shaft, a plurality of fixed contacts for said switch means positioning said fixed contacts about the periphery of said rotor in contacting relation to said movable contacts, said fixed contacts being spaced by angular separations with respect to the axis of said rotor which are equal multiple of the angular separations of the desired positions of said shaft, and are of such magnitude that the total number of available fixed contact positions so spaced in a plane about said rotor is a factor of the number of desired positions of said shaft, means to ground said fixed contacts in a plurality of unique combinations equal in number to the number of desired positions of said shaft, each of said combinations representing a respective one of said desired positions, an electric motor for rotating said shaft, a normally open circuit for controlling said motor, means including said movable and fixed contacts for maintaining said motor control circuit closed until said rotor finds a position where none of said grounded fixed contacts completes said motor control circuit, the number of desired positions of said shaft being no larger than $(2^n-2)$ where "$n$" is the number of said fixed contacts.

8. A continuously rotatable electrical selector switch comprising means for connecting one or more but not all of a group of conductors to an external circuit, means for connecting to each other all remaining conductors of said group, detenting means for locating said switch in a plurality of positions having equal angular increments of spacing, both of said connecting means having fixed contacts spaced by equal angular increments which are greater than said equal angular increments between adjacent detented positions and are an integral multiple thereof.

9. A continuously rotatable electrical selector switch, detenting means for locating said switch in a plurality of positions having equal angular increments of spacing, means actuated by the positioning of said switch in each of said positions to connect one or more but not all of a group of conductors to an external circuit and means actuated by said positioning to connect to each other all remaining conductors of said group, the combination of conductors connected to said external circuit in each of the detented positions of said switch being unique, both of said connecting means having fixed contacts spaced by equal angular increments which are greater than said equal angular increments between adjacent detented positions and are an integral multiple thereof.

10. A continuously rotatable electrical selector switch as claimed in claim 9, said switch being characterized by the fact that said equal angular increments by which said fixed contacts are spaced are of such magnitude that the total number of available positions for the location of fixed contacts so spaced is a factor of said plurality of switch positions.

11. A rotatable electrical selector switch comprising means for connecting one or more but not all of a group of conductors to an external circuit, means for connecting to each other all remaining conductors of said group, detenting means for locating said switch in a plurality of positions having equal angular increments of spacing, both of said connecting means having fixed contacts spaced by equal angular increments which are greater than said equal angular increments between adjacent detented positions and are an integral multiple thereof.

12. A rotatable electrical selector switch, detenting means for locating said switch in a plurality of positions having equal angular increments of spacing, means actuated by the positioning of said switch in each of said positions to connect one or more but not all of a group of conductors to an external circuit and means actuated by said positioning to connect to each other all remaining conductors of said group, the combination of conductors connected to said external circuit in each of the detented positions of said switch being unique, both of said connecting means having fixed contacts spaced by equal angular increments which are greater than said equal angular increments between adjacent detented positions and are an integral multiple thereof.

13. A rotatable electrical selector switch as claimed in claim 12, said switch being characterized by the fact that said equal angular increments by which said fixed contacts are spaced are of such magnitude that the total number of available positions for the location of fixed contacts so spaced is a factor of said plurality of switch positions.

14. A continuously rotatable electrical selector switch comprising means for connecting one or more but not all of a group of conductors to an external circuit, detenting means for locating said switch in a plurality of positions having equal angular increments of spacing, said means having fixed contacts spaced by equal angular increments which are greater than said equal angular increments between adjacent detented positions and are an integral multiple thereof.

15. A continuously rotatable electrical selector switch, detenting means for locating said switch in a plurality of positions having equal angular increments of spacing, means actuated by the positioning of said switch in each of said positions to connect one or more but not all of a group of conductors to an external circuit, the combination of conductors connected to said external circuit in each of the detented positions of said switch being unique, said connecting means having fixed contacts spaced by equal angular increments which are greater than said equal angular increments between adjacent detented positions and are an integral multiple thereof.

16. A continuously rotatable electrical selector switch as claimed in claim 15, said switch being characterized by the fact that said equal angular increments by which said fixed contacts are spaced are of such magnitude that the total number of available positions for the location of fixed contacts so spaced is a factor of said plurality of switch positions.

17. A rotatable electrical selector switch comprising means for connecting one or more but not all of a group of conductors to an external circuit, detenting means for locating said switch in a plurality of positions having equal angular increments of spacing, said means having fixed contacts spaced by equal angular increments which are greater than said equal angular increments between adjacent detented positions and are an integral multiple thereof.

18. A rotatable electrical selector switch, detenting means for locating said switch in a plurality of positions having equal angular increments of spacing, means actuated by the positioning of said switch in each of said positions to connect one or more but not all of a group of conductors to an external circuit, the combination of conductors connected to said external circuit in each of the detented positions of said switch being unique, said connecting means having fixed contacts spaced by equal angular increments which are greater than said equal angular increments between adjacent detented positions and are an integral multiple thereof.

19. A rotatable electrical selector switch as claimed in claim 18, said switch being characterized by the fact that said equal angular increments by which said fixed contacts are spaced are of such magnitude that the total number of available positions for the location of fixed contacts so spaced is a factor of said plurality of switch positions.

References Cited in the file of this patent

UNITED STATES PATENTS

| | | |
|---|---|---|
| 2,458,558 | Bradley | Jan. 11, 1949 |
| 2,475,675 | Peterson | July 12, 1949 |
| 2,476,673 | May | July 19, 1949 |
| 2,539,537 | Harley | Jan. 30, 1951 |
| 2,617,313 | Schweighofer | Nov. 11, 1952 |